(12) United States Patent
Studeny et al.

(10) Patent No.: US 11,427,137 B2
(45) Date of Patent: Aug. 30, 2022

(54) EMBLEM ARRANGEMENT FOR A MOTOR VEHICLE

(71) Applicant: VOLKSWAGEN AKTIENGESELLSCHAFT, Wolfsburg (DE)

(72) Inventors: Christian Studeny, Braunschweig (DE); Falko Seifert, Braunschweig (DE); Miguel Almeida Estevao, Wolfsburg (DE); Sandra Sturmat, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/311,416

(22) PCT Filed: Dec. 2, 2019

(86) PCT No.: PCT/EP2019/083313
§ 371 (c)(1),
(2) Date: Jun. 7, 2021

(87) PCT Pub. No.: WO2020/114969
PCT Pub. Date: Jun. 11, 2020

(65) Prior Publication Data
US 2022/0024374 A1    Jan. 27, 2022

(30) Foreign Application Priority Data
Dec. 5, 2018    (DE) .......................... 102018220997.9

(51) Int. Cl.
*B60R 13/00* (2006.01)
*B60Q 1/26* (2006.01)
*F21V 8/00* (2006.01)

(52) U.S. Cl.
CPC .............. *B60R 13/005* (2013.01); *B60Q 1/26* (2013.01); *G02B 6/005* (2013.01); *G02B 6/0068* (2013.01); *G02B 6/0088* (2013.01)

(58) Field of Classification Search
CPC .................................................. B60R 13/005
See application file for complete search history.

(56) References Cited

U.S. PATENT DOCUMENTS 8,232,533 B2 * 7/2012 Kingsley ................ C09K 11/06
250/459.1
9,500,333 B1    11/2016 Johnson et al.
(Continued)

FOREIGN PATENT DOCUMENTS

CN    201484317 U    5/2010
DE    10318790 A1    11/2004
(Continued)

*Primary Examiner* — Keith G. Delahoussaye
(74) *Attorney, Agent, or Firm* — Laurence A. Greenberg; Werner H. Stemer; Ralph E. Locher

(57) ABSTRACT

An emblem arrangement for a motor vehicle has an emblem support part, an element forming a brand emblem, and at least one luminous element for illuminating the emblem arrangement. The element forming the brand emblem is a layered structure having at least two layers, which layered structure has, when viewed in a plan view of the emblem arrangement, translucent and non-translucent regions. The translucent regions are able to depict the shape of the brand emblem in its entirety or wherein the translucent regions are able to depict merely the contour of the brand emblem.

15 Claims, 10 Drawing Sheets

(56) References Cited

U.S. PATENT DOCUMENTS

| | | | |
|---|---|---|---|
| 9,607,534 B2 * | 3/2017 | Dellock | B60R 13/005 |
| 10,011,215 B2 | 7/2018 | Roberts et al. | |
| 2006/0023468 A1 * | 2/2006 | Takahashi | G02B 6/0001 |
| | | | 362/555 |
| 2012/0182722 A1 * | 7/2012 | Wu | F21S 43/26 |
| | | | 362/157 |
| 2015/0138809 A1 * | 5/2015 | Salter | B60Q 1/50 |
| | | | 362/510 |
| 2015/0217681 A1 * | 8/2015 | Dellock | B60Q 1/26 |
| | | | 362/510 |
| 2016/0231493 A1 | 8/2016 | Iordache et al. | |
| 2017/0240100 A1 * | 8/2017 | Salter | B60Q 1/0011 |
| 2017/0253194 A1 * | 9/2017 | Salter | B60Q 1/2661 |
| 2018/0015877 A1 * | 1/2018 | Salter | B60R 13/005 |
| 2018/0345877 A1 | 12/2018 | Kieslich | |

FOREIGN PATENT DOCUMENTS

| | | |
|---|---|---|
| DE | 202005007720 U1 | 9/2006 |
| DE | 102008044854 A1 | 3/2010 |
| DE | 102013007378 A1 | 3/2014 |
| DE | 102013016667 A1 | 7/2014 |
| DE | 202016000238 U1 | 3/2016 |
| DE | 102014018625 A1 | 6/2016 |
| DE | 102015208981 A1 | 11/2016 |
| DE | 102016007119 A1 | 2/2017 |
| DE | 202016106857 U1 | 3/2017 |
| DE | 202017005143 U1 | 12/2017 |
| DE | 102017124355 A1 | 4/2018 |
| JP | 2011063169 A | 3/2011 |

* cited by examiner

EMBLEM ARRANGEMENT FOR A MOTOR VEHICLE

BACKGROUND OF THE INVENTION

Field of the Invention

The invention relates to an emblem arrangement for a motor vehicle having an emblem support part and an element forming a brand emblem, furthermore having at least one luminous element for illuminating the emblem arrangement, wherein the element forming the brand emblem is a layer structure comprising at least two layers which, as seen in a plan view of the emblem arrangement, comprises translucent and nontranslucent regions, wherein the translucent regions can depict the shape of the brand emblem surface-wide or wherein the brand emblem can be depicted only in its contour by the translucent regions.

An emblem arrangement for a motor vehicle has been disclosed by DE 10 2014 018 625 A1. Specifically, the emblem arrangement comprises a circular emblem, a circular emblem support part and a likewise circular disk-like light guide. There is also a component equipped with illumination means, by means of which light can be coupled into the light guide. The emblem arrangement is configured in a sandwich fashion, the light guide being arranged between the emblem and the emblem support part. The emblem comprises an annular section which encloses a star-like brand emblem (symbol). The annular section is formed from a sheet which is applied on the emblem and has a chrome appearance during the day. The film is translucent and therefore illuminable by transmission in darkness.

DE 10 2016 007 119 A1 describes a radar dome (radome) which is illuminable and likewise comprises a star-shaped symbol as a brand emblem. The radome comprises a disk-like light guide, into which light is coupled from radially laterally arranged light sources. The light coupled in travels through a light exit region radially onto a deflecting structure, with the aid of which the emerging light is directed forward in the direction of a curved transparent cover part. A number of heating elements in the form of heating wires, which prevent icing of an outer surface of the radome during operation, are arranged in the cover part. The radome is provided in order to protect a radar element arranged behind it.

DE 10 2013 007 378 A1 describes a method for producing an emblem for an automobile. A protective layer is in this case initially applied onto a sheet, which is then shaped to form a semifinished product. The semifinished product is subsequently placed in an injection-molding tool and back-molded with a translucent plastic after stamping out predetermined regions of the semifinished product.

DE 20 2005 007 720 U1 discloses a brand emblem which consists of an emblem support and an electroluminescent sheet fastened on the emblem support.

DE 20 2016 106 857 U1 discloses a phosphorescent illumination module configured as a headlamp. Specifically, a phosphorescent structure in the form of a brand emblem is applied on a cover glass of the headlamp.

CN 201 484 317 U describes an illuminable brand emblem in which the light of light-emitting diodes is emitted on the rear side and distributed in a light guide, which has the shape of a brand emblem. Distribution of the light is achieved by means of conical indentations of the light guide, which face away from the light-emitting diodes.

Lastly, DE 20 2016 000 238 U1, disclosed an illuminated brand emblem that can be illuminated surface-wide or in its contour. The brand emblem comprises a transparent lens, which may be provided on the front side with a coating against environmental influences. On the rear side, the lens comprises a depression that corresponds to the shape of the actual brand emblem. A decorative element in the form of a chrome-appearance coating is introduced into the depression. The decorative element may be configured to be illuminable by transmission. Outside the depression, the rear side of the lens is provided with an opaque sheet. In order to produce contour illumination, on the other hand, the decorative element is configured to be opaque. Outside the depression, the lens is provided with a sheet that is printed in such a way that (opaque) covering regions and translucent regions forming the contour of the brand emblem are formed. It is also proposed to configure the decorative element together with the sheet as a sheet insert, by providing the sheet with a chrome-appearance coating, subsequently shaping the sheet according to the rear-side geometry and depression of the lens, and connecting it to the lens.

SUMMARY OF THE INVENTION

The object of the present invention is to provide an illuminable emblem arrangement for a motor vehicle, with which an attractive appearance can be produced both during the day and at night.

The aforementioned object is achieved with an emblem arrangement having the features as claimed. Advantageous configurations or refinements of the invention may be found in the dependent claims.

The invention is firstly based on an emblem arrangement for a motor vehicle, which comprises an emblem support part and an element forming a brand emblem. There is furthermore at least one luminous means for illuminating the emblem arrangement. The element forming the brand element is a layer structure comprising at least two layers. In a plan view of the emblem arrangement, i.e. in a plan view of the outline of the emblem arrangement, the layer structure comprises translucent and nontranslucent regions. The shape of the brand emblem may be depicted surface-wide by the translucent regions, or is depicted in this way, or the brand element may be depicted only in its contour by the translucent regions, or is depicted in this way.

If it is assumed, purely by way of example, that a brand emblem known to road users merely comprises the outline and the surface content of a circle, it corresponds to a surface-wide depiction of the brand emblem if in addition there is likewise a translucent region in the emblem arrangement, with the outline of a circle and also with the area enclosed by the circle.

Depiction of the brand emblem only in its contour then assumes a translucent region in the emblem arrangement, which is only depicted as a linear circle, i.e. without the area enclosed by the circle.

A similar procedure may be adopted when a brand emblem comprises other symbols, shapes, signs, numbers or letters.

By the features mentioned, the prerequisites are provided so that the emblem arrangement can be illuminated in a very specific night-time design. It is in this case possible that other road users can perceive the brand emblem per se self-illuminated in darkness.

In a first alternative solution, the invention then proposes that the layer structure comprises a first layer configured as a transparent support sheet and a second layer by which the translucent and the nontranslucent regions are formed, the second layer consisting of at least two partial layers lying on one another, of which a first partial layer forms the translucent and the nontranslucent regions and the at least one second partial layer is configured to be translucent and has the same color as the translucent regions of the first partial layer.

By these features, the prerequisite is satisfied that an attractive appearance can be produced with the emblem arrangement both during the day and at night. In particular, the special layer structure makes it possible that the brand emblem can be illuminated well by transmission in darkness, and on the other hand also has a visual impression of particularly high quality in brightness.

According to a first refinement of the invention, it is proposed that the second layer consists of at least three partial layers lying on one another, of which a first partial layer forms the translucent and the nontranslucent regions and the at least one second and third partial layer are configured to be translucent and have the same color as the translucent regions of the first partial layer.

It has been found that the impression of the brand emblem can be optimized during the day, or in brightness, by such a refinement.

In another extremely advantageous configuration of the concept of the invention, the layer structure bears on a cover glass. The cover glass in this case comprises a peripheral circumferential wall, on which there is a peripheral layer structure that is different to the rest of the layer structure. The peripheral layer structure comprises at least three partial layers lying on one another, of which the color of the partial layer closest to the peripheral wall has the highest brightness and the color of the partial layer furthest away from the peripheral wall has the lowest brightness.

This can make it possible that the emblem arrangement is not illuminated in the edge region, i.e. radially outward around the actual brand emblem, in darkness, but during the day has the same visual impression as the brand emblem. This thus contributes to optimizing an appearance in high quality.

In this context, it has been found that in order to provide a brand emblem consisting of bright letters and a dark background, it is particularly expedient for the color of the partial layer furthest away from the peripheral wall to be black. The color of the partial layer closest to the peripheral wall then expediently has the same color as the translucent regions of the partial layer forming the translucent and nontranslucent regions.

Another refinement proposes that the color of the partial layer closest to the peripheral wall is white. This configuration is advantageous particularly when the brand emblem is intended to consist of white letters/symbols on a black background.

As a second solution alternative for the object mentioned in the introduction, the present invention also proposes that the layer structure comprises a first nontranslucent layer and at least one second nontranslucent layer. By the at least two nontranslucent layers, the actual brand emblem is visible surface-wide during the day. The nontranslucent layers may likewise have any desired colors or color combinations, and consist for example of chromatic or achromatic colors. The emblem arrangement furthermore comprises, in its edge region, at least one circuit board on which a plurality of luminous means are arranged, the light of which is coupled in the edge region of the emblem arrangement into a flat light guide. The flat light guide comprises, on its side facing away from the layer structure, a light output structure which is superimposed or approximately superimposed, in a plan view of the outline of the emblem arrangement, with regions in which the stated layer structure is entirely removed. These regions then in turn form the translucent regions.

This solution also forms the prerequisite that a very attractive appearance can be produced with the emblem arrangement both during the day and at night.

In order to facilitate the producibility of the emblem arrangement and therefore to reduce the production costs, it is proposed that the light output structure of the light guide is a printing.

According to another configuration of the concept of the invention, the light output structure comprises strip-like sections. The stated regions in which the layer structure is fully removed are likewise configured to be linear or strip-like, a width of the strip-like sections of the light output structure being greater than a width of the regions configured to be linear or strip-like, in which the layer structure is fully removed.

In this way, the prerequisite is provided that the brand emblem can be illuminated in a contour fashion in darkness, the interior of the emblem arrangement not being seen in brightness and the high quality impression of the emblem arrangement as a result not being perturbed.

In another configuration of the concept of the invention, it is possible for the transparent support sheet mentioned in the introduction for the first solution alternative to be a profiled sheet. The profiled sheet may, for example, be deep-drawn. This makes special 3D effects possible, so that the brand emblem may have a 3D impression.

It has been found that the regions can be metered very accurately in terms of their translucence when, in another refinement, the second layer mentioned in the introduction for the first solution alternative is a screen-printed layer, this layer thus having been applied by the screen-printing method. In this case, it is also conceivable for the nontranslucent regions to be printed in a first color (for example black) and for the translucent regions to be printed in a second color (for example white). Besides the achromatic colors mentioned, however, depending on the application, other, chromatic color combinations may also be envisioned. A combination of chromatic and achromatic colors is also conceivable.

In order to allow good light coupling into the light guide and in this case to be able to avoid hotspots, it is proposed that the light guide comprises a plurality of depressions on its side facing toward the emblem support part. A luminous means respectively protrudes into the depressions, the depressions with the luminous means being covered outward (i.e. toward a visible side of the emblem arrangement) by the nontranslucent regions.

In order to avoid overheating of the luminous means and therefore to ensure an unimpaired function, in another configuration the invention proposes to connect the emblem support part to at least one heat sink.

According to another configuration of the invention, the color of the first nontranslucent layer is black and the color of the second nontranslucent layer has a chrome-like impression. In this case, in a plan view of the outline of the emblem arrangement as seen from the visible side, the first layer comprises material recesses. Because of the material recesses, the second layer is visible in the region of the material recesses, the material recesses forming the shape of the brand emblem.

By such a refinement, a daytime design of the brand emblem with a chrome impression may be produced.

There may be a need for the emblem arrangement to be installed in front of a radar sensor. In order here not to interfere with an unimpaired function of the radar sensor by the emblem arrangement despite the layer structure with a chrome impression, it is proposed that the entire layer structure, and in particular the second layer with the chrome-like impression, is configured to be transmissive for radar beams. To this end, it is expedient for the second nontranslucent layer to consist of a semiconductor such as germanium or indium.

Good protection of the element forming the brand emblem against dirt or the like may be ensured by the element forming the brand emblem being covered outward by a cover glass. The cover glass may preferably be made of plastic, for example polycarbonate (PC). Such a material is economical and stable.

In order to optimize the protection of the emblem arrangement, it is lastly proposed for the cover glass to be coated with a UV protection layer.

When using a cover glass, it is furthermore expedient for the cover glass to be injection-molded onto the layer structure forming the brand emblem. In other words, the cover glass thereby functions as a support for the layer structure forming the brand emblem. This favors simple and process-reliable producibility of the emblem arrangement, in which case air gaps may be avoided.

For example, it is conceivable for the layer structure forming the brand emblem to be overmolded with the cover glass by the injection-molding method. As an alternative, it is conceivable to back-mold the layer structure with the cover glass by such a method.

In order to be able to ensure light coupling into the edge region of the emblem arrangement in a simple way and also not to interfere with a radar compatibility of the emblem arrangement, it is proposed to configure the circuit board mentioned in the introduction for the second solution alternative in the manner of a ring. It is, however, also advantageous in terms of process technology for there to be two semicircular circuit boards, which combine to form a ring.

In order to produce defined distances between components of the emblem arrangement, which may be important for radar compatibility, there are expediently spacers. Such spacers, which may also be connected integrally to the components, may for example be used to produce defined air gaps between the emblem support part and the light guide, between the light guide and the element forming the brand emblem and/or between the element forming the brand emblem and the cover glass.

According to one extremely advantageous configuration of the invention, it is also conceivable to arrange an annular light attenuation element between the light guide mentioned in the second solution alternative and the cover glass. In this way, the light attenuation element can reduce the intensity of the light rays emerging from the light guide in the edge region of the cover glass and therefore allow surface-wide illumination of the brand emblem with a high homogeneity in its appearance even with a desired radar compatibility.

The present invention is also intended to protect a motor vehicle which comprises at least one emblem arrangement according to the invention.

Preferred exemplary embodiments of the invention are represented in the figures and will be explained in more detail with the aid of the figures in the following description. Further advantages of the invention will thereby also become clear. References that are the same, including in different figures, relate to components that are the same, comparable or functionally equivalent. Corresponding or comparable properties and advantages are in this case achieved even if repeated description or reference thereto is not made. The figures are not, or at least not always, true to scale. In many figures, proportions or distances may be represented exaggeratedly in order to be able to highlight features of an exemplary embodiment more clearly.

DETAILED DESCRIPTION OF THE INVENTION

Figure 1:
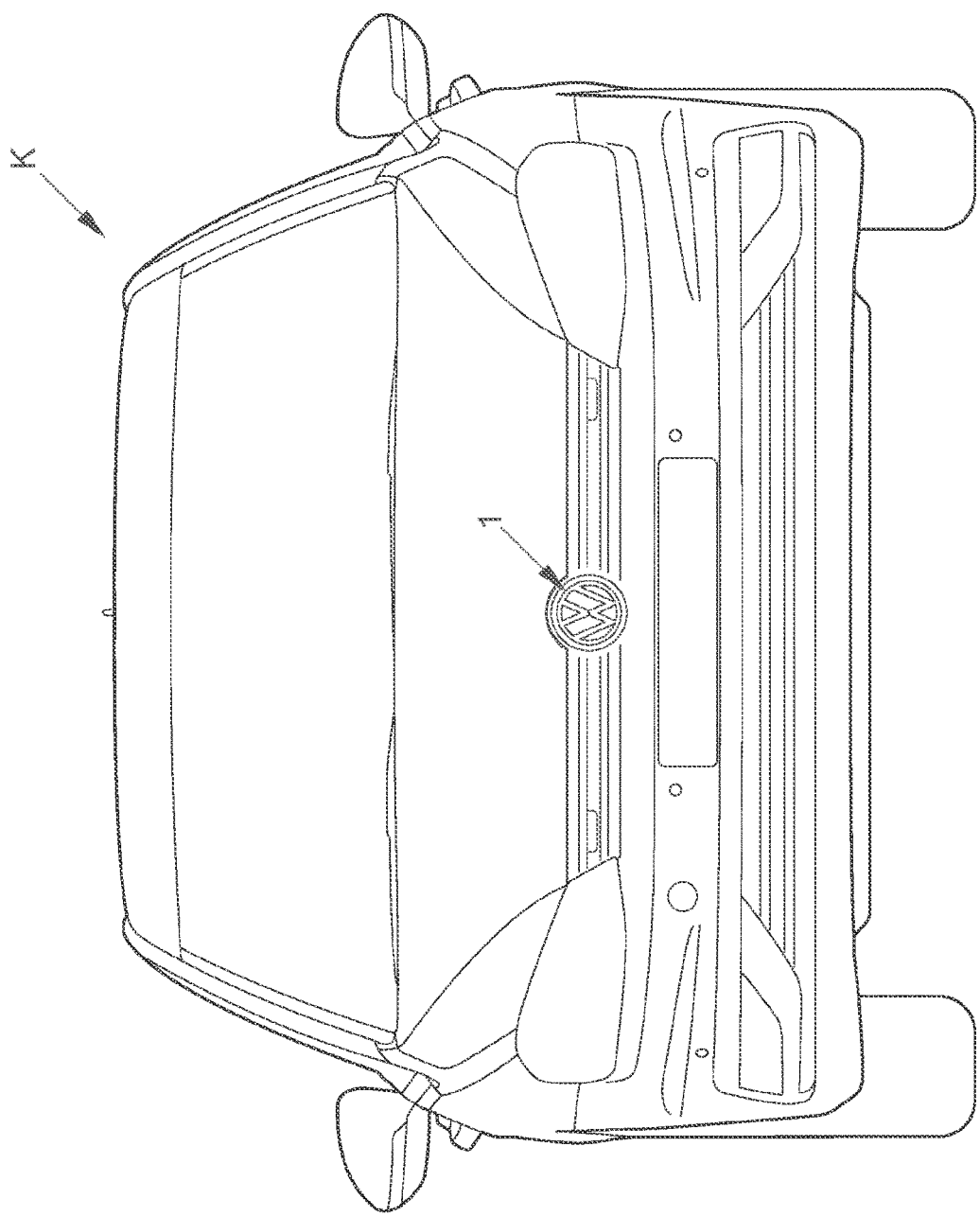
FIG. 1 shows a motor vehicle having an emblem arrangement according to the invention in a front view.

Reference is made first to FIG. 1. A motor vehicle K may be seen in this figure. The motor vehicle K may be a motor vehicle having an internal combustion engine, a hybrid vehicle or an electrically driven motor vehicle. The motor vehicle K comprises an emblem arrangement 1 on its front. The emblem arrangement 1 is configured in such a way that a particular daytime design as well as a particular night-time design can be produced with it. The motor vehicle K also comprises an emblem arrangement 1 on its vehicle tail (not visible in this figure).

Figure 2:
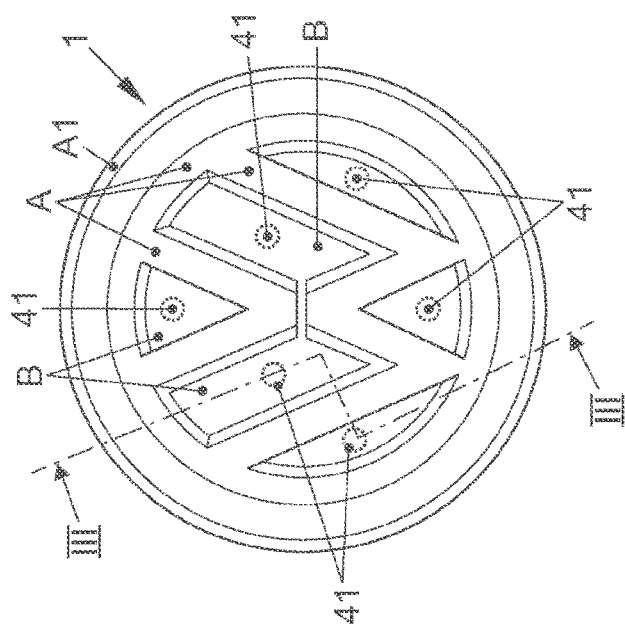
FIG. 2 shows the representation of an emblem arrangement alone, specifically in a plan view of the outline of the emblem arrangement from the visible side.

FIG. 2 represents the emblem arrangement 1 alone and in a plan view from its visible side. The emblem arrangement 1 has a circular outline. The emblem arrangement 1 is furthermore subdivided into translucent regions A and nontranslucent regions B. The shape of a brand emblem is replicated by the translucent regions A. A luminous means 41 (indicated by dashes) is respectively arranged below the nontranslucent regions B. The luminous means 41 are preferably light-emitting diodes. The light-emitting diodes 41 may also be configured as RGB LEDs, which may emit light in any desired colors.

FIG. 2 also shows a circular, likewise nontranslucent region A1 in the emblem arrangement 1, which borders the brand emblem formed by the translucent regions A.

Figure 3:
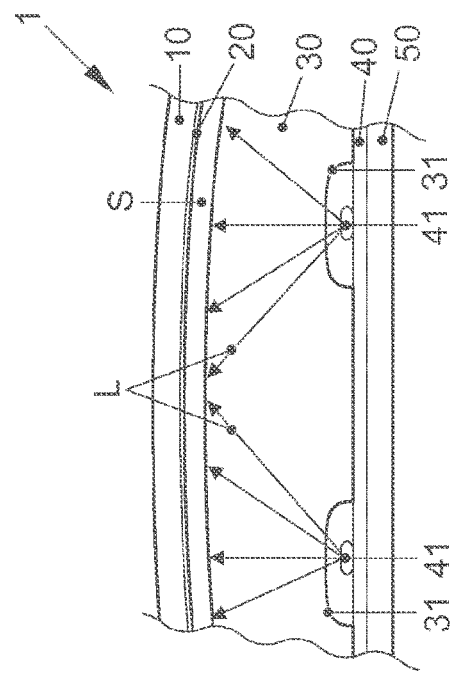
FIG. 3 shows a sectional representation according to the section profile III of FIG. 2.

With the aid of FIG. 3, it can be seen that the emblem arrangement 1 comprises an emblem support part 50, on which a circuit board 40 is arranged. The circuit board 40 carries said luminous means 41. The circuit board 40 is in turn covered by a light guide 30, which may in particular be configured as a flat light guide having output structures.

Light rays L of the luminous means 41 enter the light guide 30 and are guided outward in the direction of a cover glass 10 covering the light guide 30. The cover glass 10 is preferably made of plastic, preferably polycarbonate.

A layer structure 20 is arranged on the inner side, facing toward the light guide 30, of the cover glass 10. The translucent and nontranslucent regions A and B visible in FIG. 2 are produced by the layer structure 20. The translucent regions A form the actual brand emblem. The layer structure 20 will be explained in more detail below.

There is an air gap S between the cover glass 10 and the light guide 30.

It may furthermore be seen that the light guide 30 comprises depressions 31 on its side facing away from the cover glass 10 and toward the circuit board 40. A luminous means 41 respectively protrudes into the depressions 31. The depressions 41 thus respectively form a suitable light input position for the light rays L of a luminous means 41.

Under certain circumstances, it is also conceivable to omit the use of the light guide 30. In this case, however, the bounding walls of the space then freed between the circuit board 40 and the layer structure 20 must be configured to be highly reflective (preferably white) in order actually to be able to achieve the required homogeneity in the light distribution.

Figure 4:
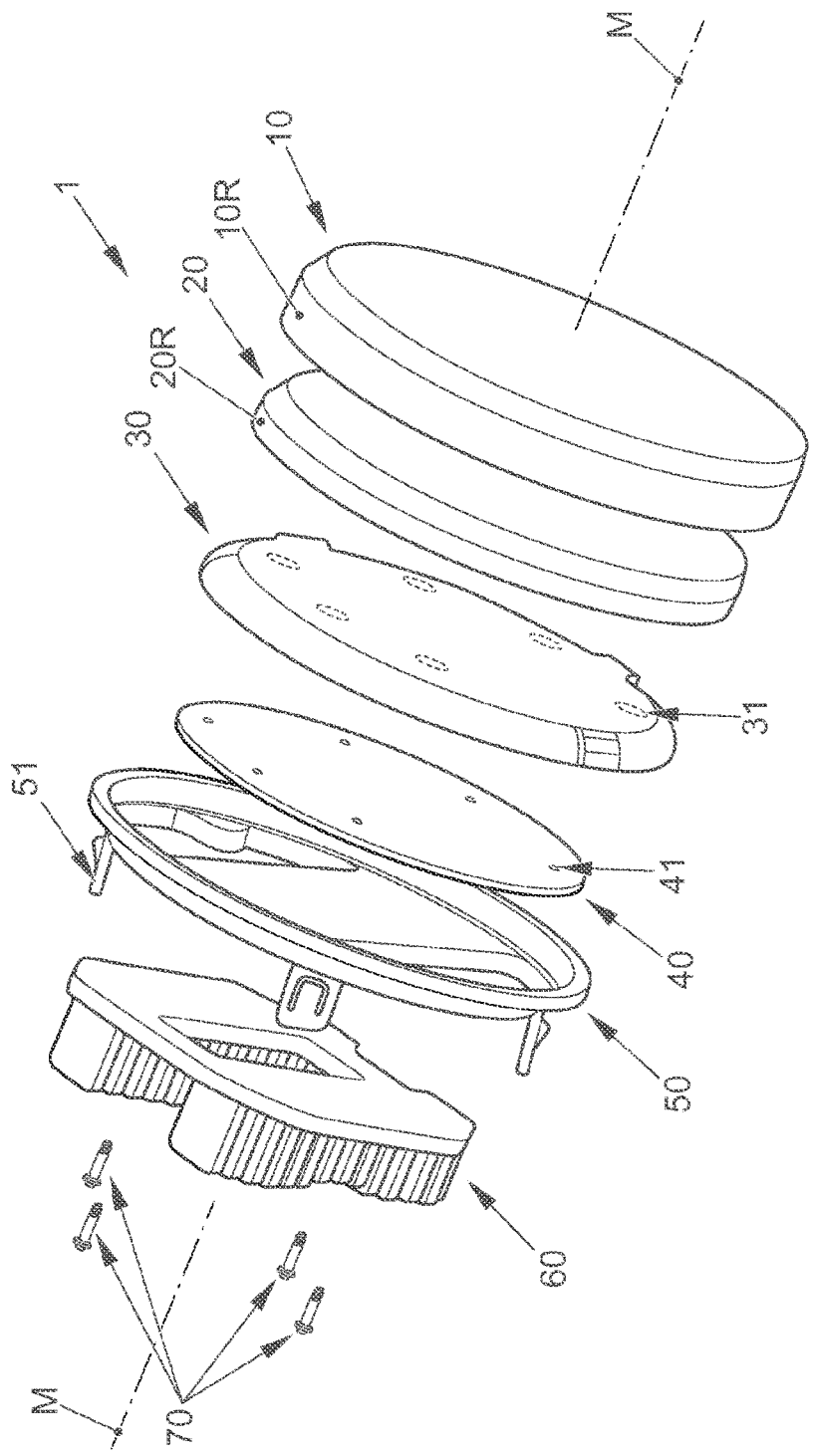
FIG. 4 shows a perspective exploded representation of the emblem arrangement.

A perspective structure of the emblem arrangement 1 in an exploded representation may now be seen with the aid of FIG. 4. The sandwich-like structure of the emblem arrangement 1 may be seen particularly well from this representation. Thus, the emblem support part 50 is used on one side to fasten a heat sink 60 by means of fastening means 70 and on the other side to fasten the cover glass 10.

The circuit board 40 with the luminous means 41, the light guide 30 and said sandwich structure 20 are received in a sandwich fashion between the emblem support part 50 and the cover glass 10, which has a peripheral circumferential wall 10R. The layer structure 20 likewise has a peripheral circumferential layer structure 20R comparable to a circumferential wall. The circuit board 40 and the light guide 30 are configured in a disk-like fashion.

The mounted emblem arrangement 1 may be mounted by latching by means of latching means 51 in latching openings (not represented in detail) of the motor vehicle K.

Most components of the emblem arrangement 1 are configured to be circular, with a midaxis M.

A possible layer structure, or a possible arrangement of the layers, will be explained in more detail with the aid of FIG. 5. Thus, it is conceivable for said layer structure 20 to be overmolded with the cover glass 10 (cf. FIG. 5a). The cover glass 10 and the layer structure 20 are therefore connected to one another materially by the injection-molding method.

The layer structure 20 comprises a transparent support sheet 20a. The support sheet 20a is preferably deep-drawn and therefore has a three-dimensional structure. On its side facing away from the cover glass 10, the support sheet 20a is printed with a screen-printed layer 20b, i.e. one which has been applied onto the support sheet 20a by the screen-printing method. The screen printing is configured according to whether translucent regions A nontranslucent regions B are intended to be produced.

Thus, the screen printing forms a white and translucent coating, which can therefore be illuminated by transmission, on the translucent regions A (cf. FIG. 2).

On the nontranslucent regions B, the screen printing is configured to be nontranslucent, for example in a black color.

The effect of this is that the emblem arrangement 1 has a daytime impression during the day, in which the regions A appear white and the regions B appear black. The actual brand emblem is depicted by the regions A and optically stands out very clearly from the regions B.

If the light rays L1 impinge from the outside on the emblem arrangement 1 during the day, they travel through the transparent cover glass 10 and through the transparent support sheet 20a as far as the screen-printed layer 20b. The light rays L1 are reflected back by the screen-printed layer 20b in such a way that an observer is provided with the brand emblem visible in FIG. 2, which is formed by the regions A.

In darkness on the other hand, and when the luminous means 41 are activated, the light rays L2 emitted by the luminous means 41 are homogenized by the light guide 30 and only travel outward through the translucent regions A of the screen-printed layer 20b. The light rays L2 of the luminous means 41 are stopped at the nontranslucent regions B.

In this way, in the exemplary embodiment, the translucent regions A of the screen-printed layer 20 may be backlit so that a brand emblem illuminating surface-wide with the regions A appears (cf. FIG. 2).

In the exemplary embodiment, it is also represented that the cover glass 10 may be covered externally with a UV protection layer 10a. Furthermore, possible air gaps in the emblem arrangement 1 are denoted by S.

Figure 5B:
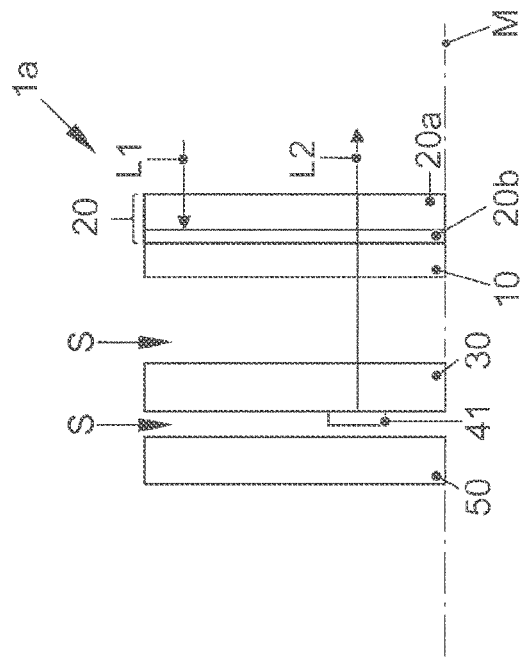
FIG. 5b shows a very schematic representation of a possible layer structure in a second embodiment of the emblem arrangement.
Figure 5A:
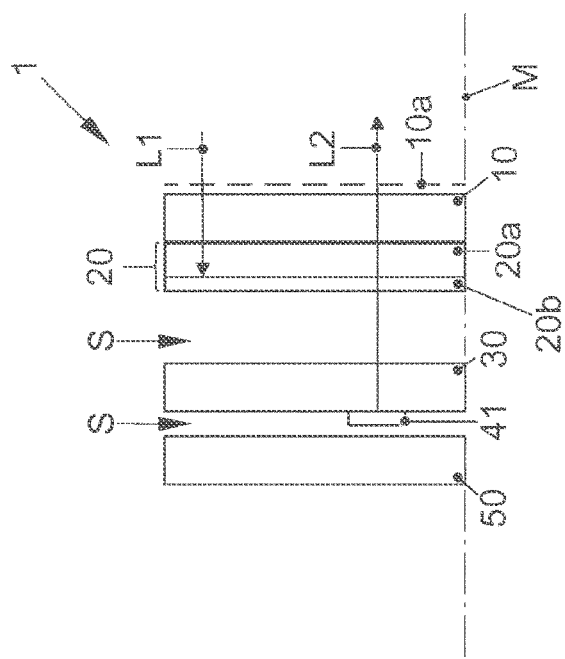
FIG. 5a shows a very schematic representation of a possible layer structure for a first embodiment of the emblem arrangement.

FIG. 5b shows a variant of the emblem arrangement 1a, in which in contrast to FIG. 5a the layer arrangement 20 is back-molded with the cover glass 10. In this case, although the light guide 30 and the emblem support part 50 are also protected by the cover glass 10, the layer structure 20 is not protected, so that the exemplary embodiment according to FIG. 5a is preferred.

The layer structure of the emblem arrangement 1 will be described in more detail with the aid of FIG. 5c. Thus, it may firstly be seen that the emblem arrangement 1 comprises the layer structure 20 in the front region, and in the edge region, i.e. in the region of the peripheral circumferential wall 10R of the cover glass 10, it comprises a layer structure 20R different thereto.

Specifically, the layer structure 20 is formed initially by the transparent support sheet 20a, on which the layer 20b is applied, in particular as a screen-printed layer. The layer 20b in turn consists of at least two partial layers lying on one another, in the exemplary embodiment three partial layers 20b1, 20b2 and 20b3.

The translucent regions A and the nontranslucent regions B are formed by the partial layer 20b1. Expediently, the transparent support sheet 20a is initially printed with a nontranslucent layer while masking the regions A. The nontranslucent layer 20b1 may, for example, have the color black. In the second step, after drying the first partial layer 20b1 and removing the masking, surface-wide application of the second partial layer 20b2 may then be carried out by printing the first partial layer 20b1 with a further color. In this way, the previously masked regions A inside the first partial layer 20b1 are also permeated with the color of the second partial layer 20b2, i.e. they have the same color. The second partial layer 20b2 (and therefore also each region A) is configured to be translucent. In turn after drying the second partial layer 20*b*2, the application of the third partial layer 20*b*3 is carried out by surface-wide printing of the second partial layer 20*b*2 with the same color as that of the partial layer 20*b*2. The partial layer 20*b*3 is also configured to be translucent. In the present exemplary embodiment, the partial layers 20*b*2 and 20*b*3 are produced by printing with a white color.

Such a configuration of the layer structure 20 on the one hand provides good illuminability of the layer structure 20 by transmission, and on the other hand a color appearance with a high-quality impression may be achieved during the day.

It may also be seen in the figure that the support sheet 20*a* and the layer structure 20*b* or 20R adjacent thereto bears on the cover glass 10. In the exemplary embodiment, the peripheral layer structure 20R consists of five partial layers 20R1 to 20R5.

All the partial layers 20R1 to 20R5 are configured to be nontranslucent (opaque) almost nontranslucent. It is ensured at least that all the partial layers 20R1 to 20R5 together are 100 percent nontranslucent.

However, the individual partial layers 20R1 to 20R5 have colors of different brightnesses H. Thus, the first partial layer 20R1 closest to the wall 10R has the color with the highest brightness H, and the last partial layer 20R5 furthest away from the wall 10R has the color with the lowest brightness H.

Between the partial layers 20R1 to 20R5, a uniform graduation in the brightness H of the colors is preferably selected.

In the exemplary embodiment, black is selected as the color of the partial layer 20R5. White is selected as the color of the partial layer 20R1.

In the exemplary embodiment, said layers or partial layers are configured in such a way that in the daytime design of the emblem arrangement 1 (i.e. in the illuminated state), a color impression in the so-called L*a*b* color space with the following values is obtained:

|  | L*(D65) | A*(D65) | B*(D65) |
| --- | --- | --- | --- |
| Color white | 61.82 | −1.03 | −1.80 |
| Color black | 3.54 | −0.07 | −1.33 |

In this case, the lightness is indicated by the L values and the color intensity between green and red (a) or between blue and yellow (b) are indicated by the a and b values.

The value D65 indicates that the color impression has been measured during illumination of the emblem arrangement 1 with a standard light source having a D65 spectrum (daylight, 6500 K).

It is also indicated in the figure that further imperfections 33 that promote orientation of light rays L3 in the direction of the cover glass 10 may be introduced in the light guide 30.

Figure 5D:
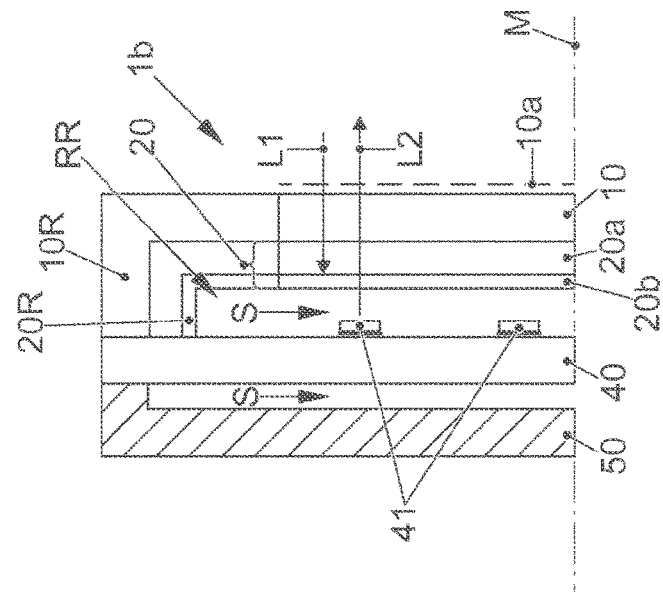
FIG. 5d shows a very schematic representation of a further embodiment of the emblem arrangement with the omission of a light guide.
Figure 5C:
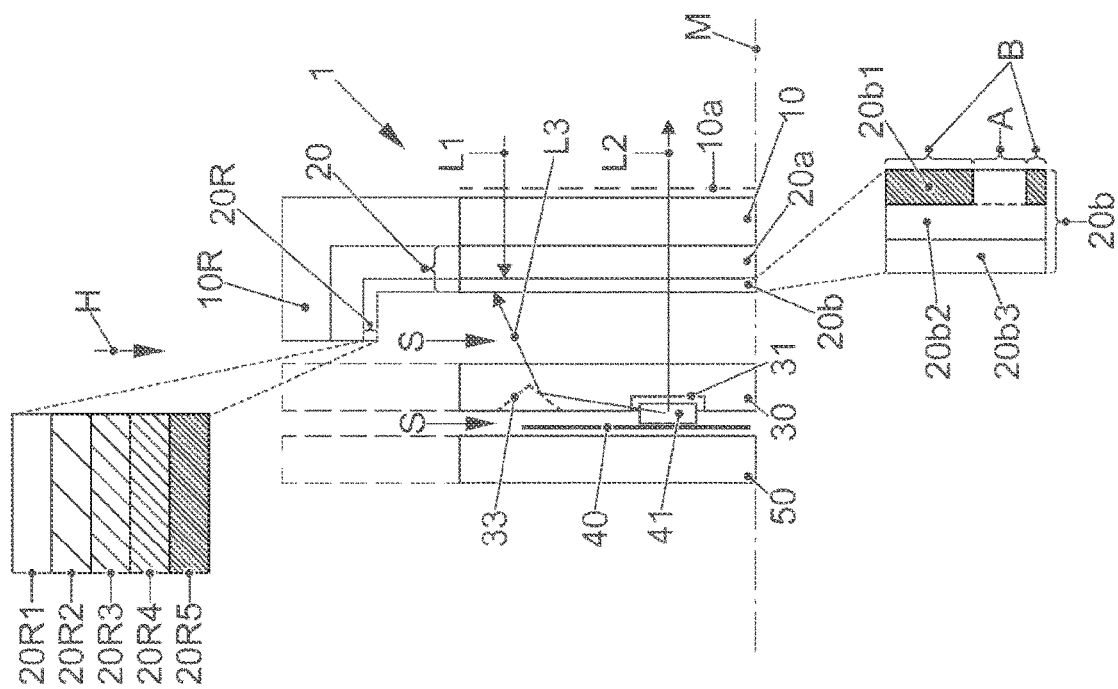
FIG. 5c shows a detailed representation of the layer structure in both the front and edge regions of the emblem arrangement.

FIG. 5*d* shows an emblem arrangement 1*b* which, in contrast to the previous exemplary embodiment, omits the use of a light guide. The layer structure 20*b* or 20R is, however, the same.

In particular, a reflection space RR that acts as a light chamber which are filled homogeneously with light rays is in this case formed by the circuit board 40 and the cover glass 10. The walls bounding the reflection space RR are expediently coated with a highly reflective layer in order to promote homogenization of the light rays.

Figure 5E:
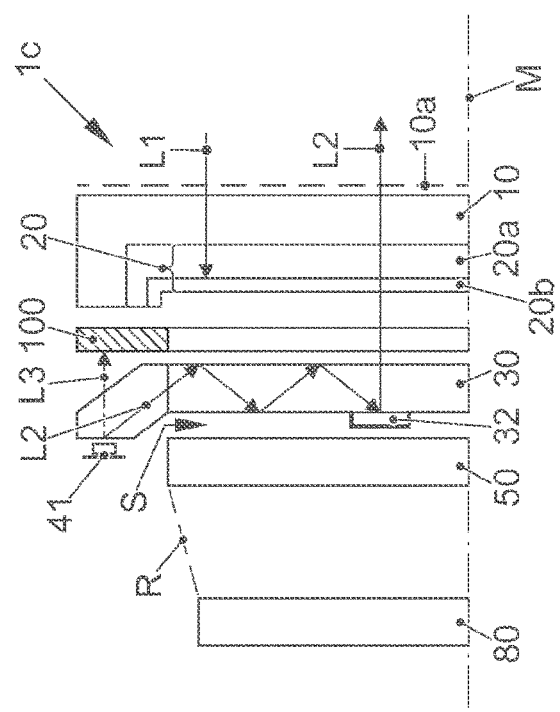
FIG. 5e shows a very schematic representation of yet another embodiment of the emblem arrangement with the use of a light attenuation element.

An emblem arrangement 1*c* in which, in contrast to the emblem arrangement 1, light rays L2, L3 of luminous means (LEDs) 41 are coupled peripherally into the light guide 30 may be seen with the aid of FIG. 5*e*. In addition, a ring-like light attenuation element 100 is arranged between the light guide 30 and the cover glass 10. This leads to light rays L3 that emerge from the light guide 30 in the direction of the cover glass 10 in the edge region being attenuated in their intensity. In this way, it is possible to use a radar sensor 80 having a radar cone R and nevertheless to avoid the occurrence of an excessive perturbing light intensity in the edge region of the cover glass 10.

Figure 6:
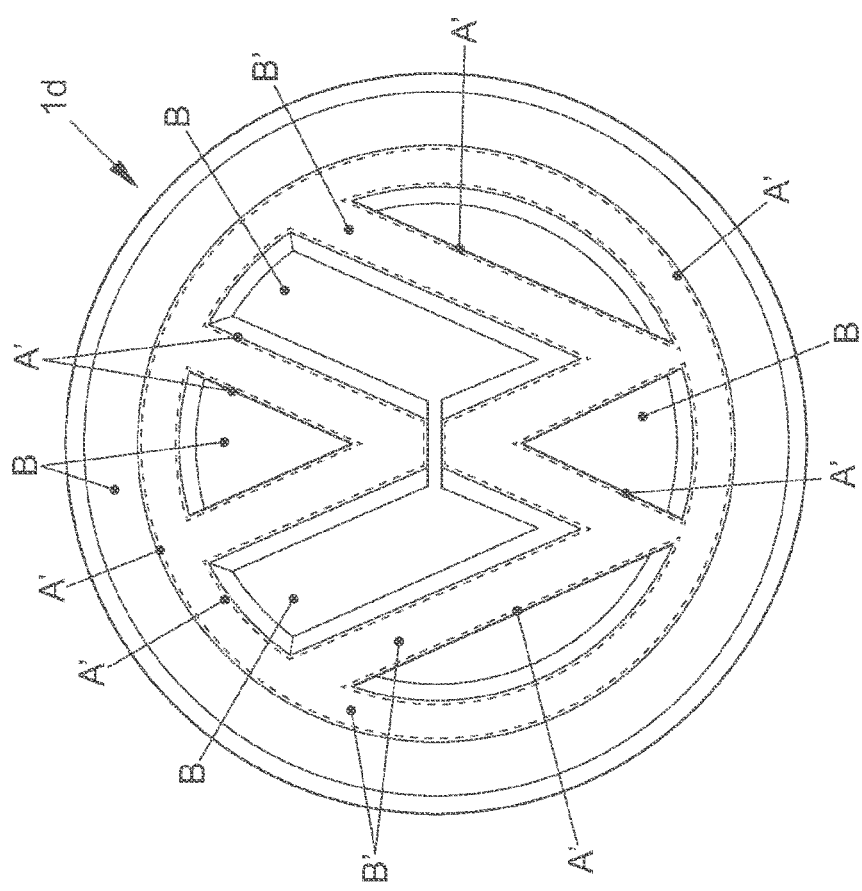
FIG. 6 shows the plan view of an emblem arrangement alone in a further embodiment.

An emblem arrangement 1*d* with which a very different daytime and night-time design can be produced will be described with the aid of FIG. 6. Specifically, there is in this case a layer structure that comprises a brand emblem and by which translucent regions A' that are configured to be linear or at most as thin strips are produced. The translucent regions A' bound nontranslucent regions B' in a contour fashion. Furthermore, nontranslucent regions B are in turn arranged between the translucent regions A'.

The layer structure, which will be explained in more detail below, of the emblem arrangement 1*d* is also constructed somewhat differently. This leads to the nontranslucent regions B' being much more visible for an observer during the day, and a brand emblem formed by the nontranslucent regions B' therefore being much more visible.

In darkness, on the other hand, only the translucent regions A' are backlit so that only a contour, formed by the regions A', of the brand emblem is visible.

Figure 6A:
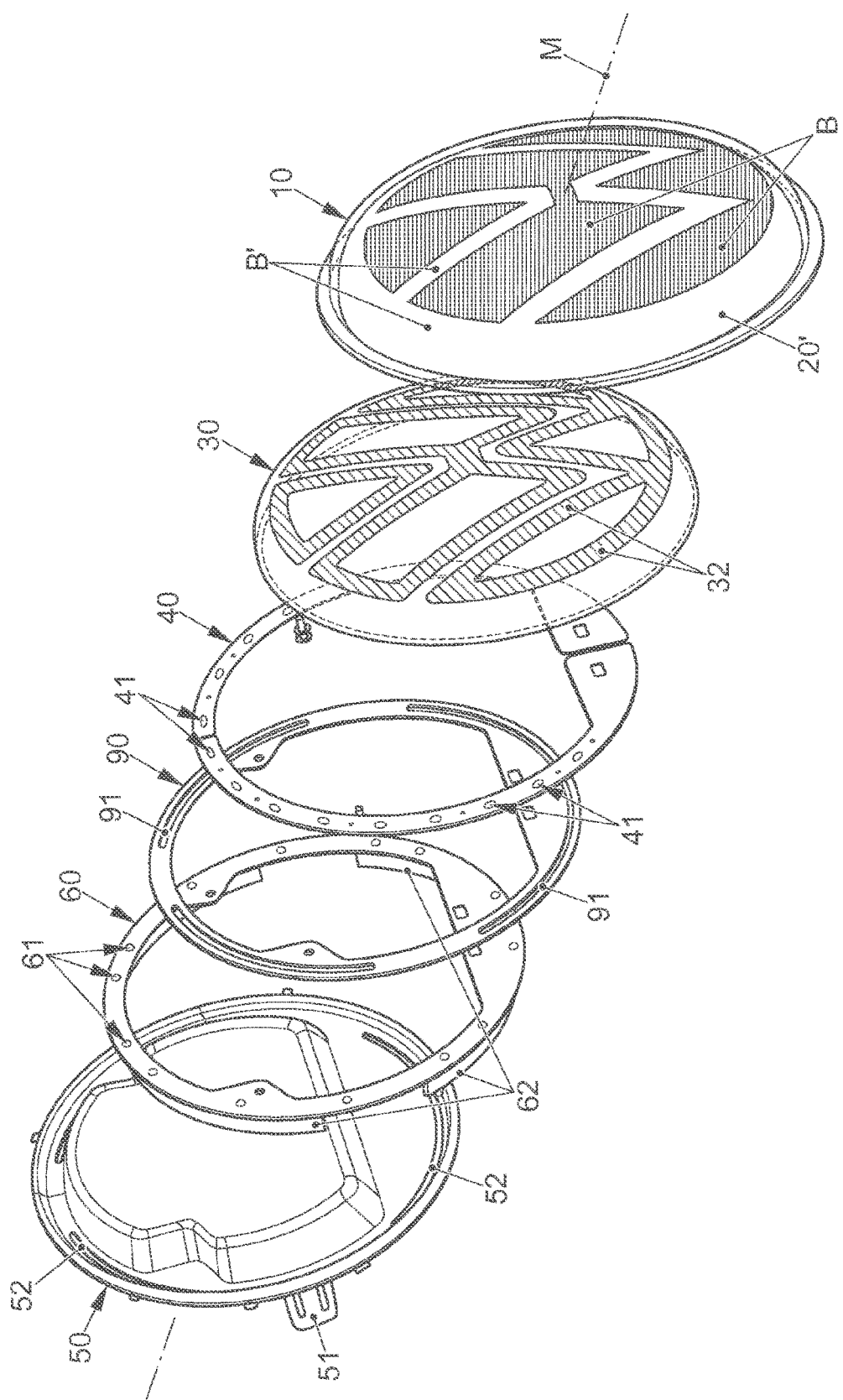
FIG. 6a shows a perspective exploded representation of the emblem arrangement according to FIG. 6, FIG. 7 show a very schematic representation of possible layer structures in three variants.

FIG. 6*a* shows the emblem arrangement 1*d* in a perspective exploded representation. Specifically, there is firstly again a cover glass 10, on the rear side of which a layer structure 20' is applied. This is followed by a light guide 30, which in particular is configured two-dimensionally (as a flat light guide) and comprises a light output structure consisting of linear or strip-like light output regions 32 on the rear side (facing away from the cover glass 10). This is followed by an annular circuit board 40 that supports a multiplicity of, for example 24, uniformly distributed LEDs 41. An annular heat sink 60 is used to dissipate the heat generated by the LEDs 41. A seal 90 is used to seal the emblem arrangement 1*d* from a wet region (not represented) in the mounting position. Slit-like openings 91 in the seal 90 allow projections 61 of the heat sink 60 to pass through, so that these can contact the rear side of the circuit board 40 for the purpose of cooling. Correspondingly, an emblem support part 50 also comprises slit-like openings 52, which are arranged in the region of the openings 91 and correspond to their shape and number. Correspondingly shaped cooling ribs 62 of the heat sink 60 protrude through the openings 52. The components of the emblem arrangement 1*d* are likewise configured to be circular, so that there is a midaxis M.

Figure 7A:
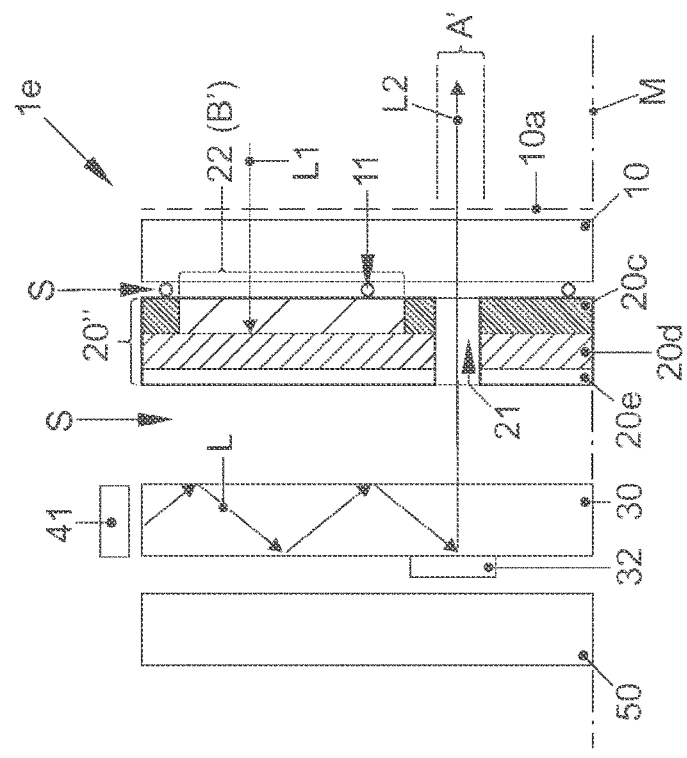

FIG. 7 in turn schematically represent possible layer structures. Thus, in these exemplary embodiments, a radar sensor 80 is intended to be covered by the emblem arrangement 1*d* (only represented in FIG. 7*a*) in the mounting state of the emblem arrangement 1*d*. For this reason, luminous means 41 are in this case arranged only laterally with respect to the light guide 30, so that the luminous means 41 lie outside a radar cone R that can be produced. It is conceivable for a plurality of luminous means 41 to be arranged distributed on the radial outer side of the light guide 30. This may, for example, be achieved by the annular circuit board 40 as shown in FIG. 6*a*. The orientation resulting therefrom of the luminous means 41 is indicated by dashes. Their light is coupled into a light input surface 34 on the end side of the light guide 30. Light rays L are therefore coupled from the radial outer side into the light guide 30 and in turn output in the direction of the cover glass 10 through light output regions 32.

In one embodiment (FIG. 7a), a layer structure 20' is injection-molded onto the rear side of the cover glass 10.

The layer structure 20' consists of a nontranslucent, preferably black layer 20c (this layer forms the nontranslucent regions B) and a radar-transmissive layer 20d facing away from the light guide 30. This layer 20d furthermore has a chrome impression. The use of the semiconductor germanium or indium is preferred as the material for the radar-transmissive layer, which furthermore has a chrome impression. Other equivalent materials may also be envisioned.

It may furthermore be seen that the layer structure 20' is fully removed in certain regions 21. The regions 21 are in particular configured to be linear or as thin strips. In a plan view of the outline of the emblem arrangement 1, the regions 21 are oriented in such a way that they are approximately superimposed with the light output regions 32, which are likewise configured to be linear or as thin strips. Preferably, a width b1 of the light output regions 32 is greater than a width b2 of the regions 21. The width of the light output regions 32 is particularly preferably selected in such a way that in a view from the outside onto the emblem arrangement 1d, the regions 21 from all angles are overlapped by the light output regions 32 and an observer does not have a free view of the components located behind the light output regions 32.

This furthermore has the effect that, when light rays L of the luminous means 41 are emitted, they travel outward at the light output regions 32 through the regions 21 and the transparent cover glass 10 as light rays L2 and form the translucent regions A' illuminating in a contour fashion.

Furthermore, there are material recesses 22 in the nontranslucent layer 20c. In a plan view of the outline of the emblem arrangement 1d from the visible side, the material recesses 22 have the outline of the nontranslucent regions B' and therefore depict the shape of the actual brand emblem in the surface (cf. also FIG. 6). In addition, it is conceivable to fill the regions 21, in which the layer structure 20' has been removed, at least partially with a semitransparent layer 23, which may for example correspond approximately to the nontranslucent layer 20c in its thickness.

The material recesses 22 may also be filled with material of the chrome-impression layer 20d, depending on the production method. This applies, for example, when the black layer 20c is initially applied onto the cover glass 10 and while masking the recesses 22, or the nontranslucent regions B' onto the cover glass 10, and the chrome-impression layer 20d is only then applied, preferably vapor-deposited, surface-wide onto the substrate consisting of the cover glass 10 and the layer 20c.

Light rays L1 that impinge on the emblem arrangement 1 from the ambient light therefore initially travel through the cover glass 10 and then impinge on the chrome-impression layer 20d. By reflection, the appearance of a brand emblem with a chrome luster is thus created for an observer in daylight. 10a in turn denotes a UV protection layer, which may be applied on the outer side of the cover glass 10. Possible air gaps are denoted by S.

Figure 7B:
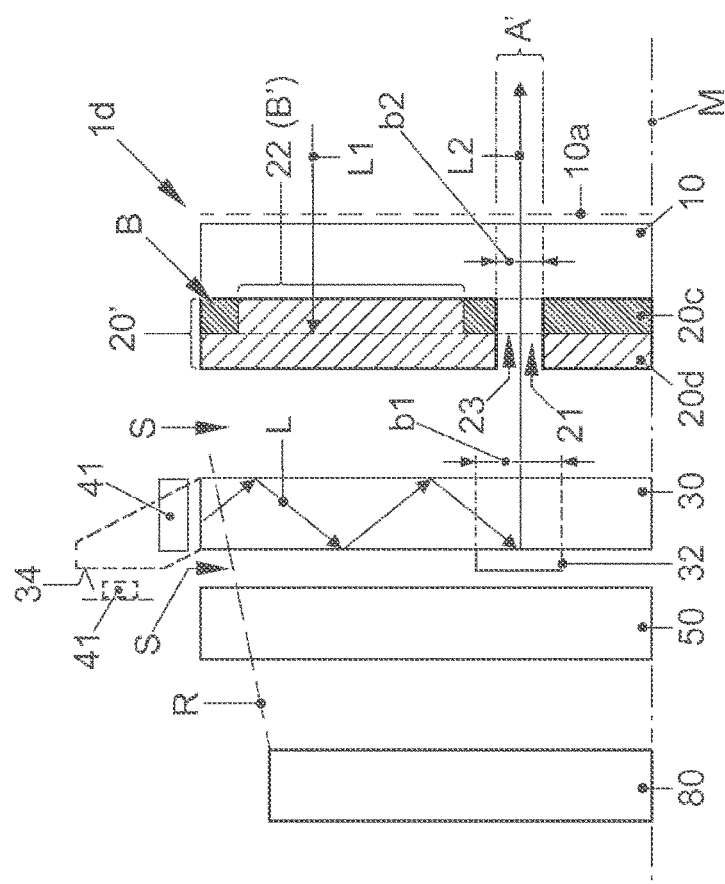

In FIG. 7b, in contrast to FIG. 7a, there is a somewhat different layer structure 20" in an emblem arrangement 1e. Specifically, the layer structure 20" comprises a transparent support part 20e, which may preferably be configured in the manner of a plate. Under certain circumstances, it is also conceivable to configure the support part 20e as a deep-drawn sheet, and therefore to offer the prerequisite for a 3D effect. Applied on the support part 20e, there is in turn a chrome-impression radar-transmissive layer 20d, which is itself covered with a nontranslucent, preferably black layer 20c while masking the material recesses.

Using this structure, the layer structure 20" may be prefabricated as a separate independent component. A material connection to the cover glass 10, for example by overmolding, may therefore be omitted here. In order to be able to produce a defined air gap S, however, it is expedient to have point-like spacing bumps 11 as spacers at particular positions between the layer structure 20" and the cover glass 10. The spacing bumps 11 may preferably be an integral component of the cover glass 10.

Moreover, the use of spacers comparable to the spacing bumps 11 is also conceivable and expedient at other positions where spaces or air gaps S arising between the components are intended to be controlled. For example, spacers are therefore also conceivable between the housing 50 and the light guide 30 and/or also between the light guide 30 and the layer structure 20, 20', 20".

Figure 7C:
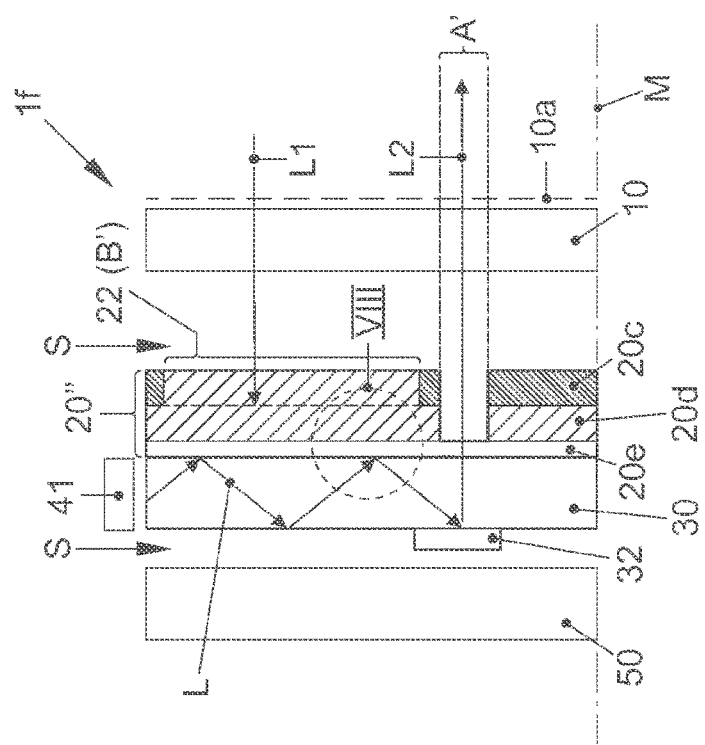

Lastly, FIG. 7c represents an embodiment of an emblem arrangement 1f in which, in contrast to FIG. 7b, the layer structure 20" is applied directly on the light guide 30.

Figure 8:
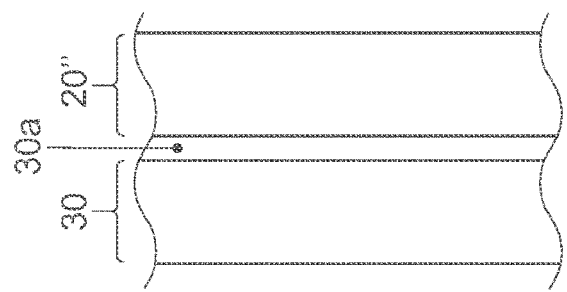
FIG. 8 shows a detail representation of detail VIII of FIG. 7c.

In order to avoid output of light rays L too early because of direct contact of an interface formed by the layer structure 20" with the light guide 30, however, a transparent layer 30a that has a different refractive index than the light guide 30 (cf. FIG. 8) and faces toward the layer structure 20" is applied on the light guide 30. This makes it possible that the light rays L travel as far as the light output regions 32 and are output only there as light rays L2 in the direction of the cover glass 10.

LIST OF REFERENCES

1, 1a-1f emblem arrangement
10 cover glass
10a UV protection layer
10R peripheral circumferential wall of the cover glass
11 spacing bumps
20, 20', 20" layer structure
20a transparent support sheet, deep-drawn
20b screen-printed layer
20b1-20b3 partial layers
20c nontranslucent layer
20d chrome-impression radar-transmissive layer
20e transparent support part
20R peripheral layer structure
20R1-20R5 partial layers
21 linear or strip-like regions
22 material recesses
23 semitransparent layer
30 light guide
30a transparent layer with different refractive index than light guide
31 depressions
32 linear or strip-like light output regions
33 imperfections
34 light input surface
40 circuit board
41 luminous means, LEDs
50 emblem support part
51 batching means
52 slit-like openings
60 heat sink
61 projections
62 cooling ribs 70 fastening means
80 radar sensor
90 seal
91 slit-like openings
100 light attenuation element
A, A' translucent regions
A1 translucent region
B, B' nontranslucent regions
b1, b2 width
H brightness
K motor vehicle
L, L1, L2, L3 light rays
M midaxis
R radar
RR reflection space
S air gaps

The invention claimed is:

1. An emblem arrangement for a motor vehicle, the emblem arrangement comprising:
an emblem support part;
at least one luminous element for illuminating the emblem arrangement; and
an element forming a brand emblem, said element being a layer structure with at least two layers which, as seen in a plan view of the emblem arrangement, is formed with translucent regions and nontranslucent regions, wherein the translucent regions are formed to depict a shape of the brand emblem surface-wide or wherein the translucent regions depict the brand emblem only in a contour thereof;
wherein:
said layer structure includes a first layer being a transparent support sheet and a second layer forming the translucent regions and the nontranslucent regions, said second layer having at least two partial layers lying on one another and including a first partial layer, defining the translucent regions and the nontranslucent regions, and a second partial layer being translucent and having the same color as the translucent regions of said first partial layer;
or:
said layer structure includes a first nontranslucent layer and at least one second nontranslucent layer;
at least one circuit board in an edge region of the emblem arrangement carrying a plurality of luminous means configured to generate light to be coupled in the edge region of the emblem arrangement into a flat light guide; and
said flat light guide, on a side facing away from said layer structure, having a light output structure which is superimposed, in a plan view of an outline of the emblem arrangement, with regions in which said layer structure is entirely removed and which form the translucent regions; and
further comprising an annular light attenuation element arranged between said light guide and a cover glass covering said layer structure.

2. An emblem arrangement for a motor vehicle, the emblem arrangement comprising:
an emblem support part;
at least one luminous element for illuminating the emblem arrangement; and
an element forming a brand emblem, said element being a layer structure with at least two layers which, as seen in a plan view of the emblem arrangement, is formed with translucent regions and nontranslucent regions, wherein the translucent regions are formed to depict a shape of the brand emblem surface-wide or wherein the translucent regions depict the brand emblem only in a contour thereof;
wherein:
said layer structure includes a first layer being a transparent support sheet and a second layer forming the translucent regions and the nontranslucent regions, said second layer having at least two partial layers lying on one another and including a first partial layer, defining the translucent regions and the nontranslucent regions, and a second partial layer being translucent and having the same color as the translucent regions of said first partial layer;
or:
said layer structure includes a first nontranslucent layer and at least one second nontranslucent layer;
at least one circuit board in an edge region of the emblem arrangement carrying a plurality of luminous means configured to generate light to be coupled in the edge region of the emblem arrangement into a flat light guide; and
said flat light guide, on a side facing away from said layer structure, having a light output structure which is superimposed, in a plan view of an outline of the emblem arrangement, with regions in which said layer structure is entirely removed and which form the translucent regions; and
further comprising spacers disposed to produce defined air gaps between said emblem support part and said light guide, between said light guide and said element forming the brand emblem, and/or between said element forming the brand emblem and a cover glass.

3. An emblem arrangement for a motor vehicle, the emblem arrangement comprising:
an emblem support part;
at least one luminous element for illuminating the emblem arrangement; and
an element forming a brand emblem, said element being a layer structure with at least two layers which, as seen in a plan view of the emblem arrangement, is formed with translucent regions and nontranslucent regions, wherein the translucent regions are formed to depict a shape of the brand emblem surface-wide or wherein the translucent regions depict the brand emblem only in a contour thereof;
wherein:
said layer structure includes a first nontranslucent layer and at least one second nontranslucent layer;
at least one circuit board in an edge region of the emblem arrangement carrying a plurality of luminous means configured to generate light to be coupled in the edge region of the emblem arrangement into a flat light guide; and
said flat light guide, on a side facing away from said layer structure, having a light output structure which is superimposed, in a plan view of an outline of the emblem arrangement, with regions in which said layer structure is entirely removed and which form the translucent regions; and
wherein said at least one circuit board has a ring shape.

4. The emblem arrangement according to claim 3, further comprising a cover glass abutting said layer structure, said cover glass comprising a peripheral circumferential wall on which there is a peripheral layer structure that is different from a remainder of said layer structure and comprises at least three partial layers lying on one another, and wherein color of a partial layer closest to said peripheral wall has a highest brightness and a color of a partial layer farthest away from said peripheral wall has a lowest brightness.

5. The emblem arrangement according to claim 4, wherein the color of the partial layer farthest away from said peripheral wall is black and the color of the partial layer closest to said peripheral wall has the same color as the translucent regions of said partial layer forming the translucent and nontranslucent regions.

6. The emblem arrangement according to claim 5, wherein the color of said partial layer closest to said peripheral wall is white.

7. An emblem arrangement for a motor vehicle, the emblem arrangement comprising:
  an emblem support part;
  at least one luminous element for illuminating the emblem arrangement; and
  an element forming a brand emblem, said element being a layer structure with at least two layers which, as seen in a plan view of the emblem arrangement, is formed with translucent regions and nontranslucent regions, wherein the translucent regions are formed to depict a shape of the brand emblem surface-wide or wherein the translucent regions depict the brand emblem only in a contour thereof;
  wherein:
  said layer structure includes a first layer being a transparent support sheet and a second layer forming the translucent regions and the nontranslucent regions, said second layer having at least two partial layers lying on one another and including a first partial layer, defining the translucent regions and the nontranslucent regions, and a second partial layer being translucent and having the same color as the translucent regions of said first partial layer;
  or:
  said layer structure includes a first nontranslucent layer and at least one second nontranslucent layer;
  at least one circuit board in an edge region of the emblem arrangement carrying a plurality of luminous means configured to generate light to be coupled in the edge region of the emblem arrangement into a flat light guide; and
  said flat light guide, on a side facing away from said layer structure, having a light output structure which is superimposed, in a plan view of an outline of the emblem arrangement, with regions in which said layer structure is entirely removed and which form the translucent regions; and
  further comprising a cover glass abutting said layer structure, said cover glass including a peripheral circumferential wall on which there is a peripheral layer structure that is different from a remainder of said layer structure and having at least three partial layers lying on one another, and wherein color of a partial layer closest to said peripheral wall has a highest brightness and a color of a partial layer farthest away from said peripheral wall has a lowest brightness.

8. The emblem arrangement according to claim 7, wherein said second layer further comprises a third partial layer configured to be translucent and have the same color as the translucent regions of the first partial layer.

9. The emblem arrangement according to claim 7, wherein a light output structure of said light guide is a printing.

10. The emblem arrangement according to claim 7, wherein said light output structure is formed with strip-shaped sections, and the regions in which said layer structure is fully removed are linear or strip-shaped, and a width of said strip-shaped sections is greater than a width of the regions that are linear or strip-shaped.

11. The emblem arrangement according to claim 7, wherein said light guide, on a side facing toward said emblem support part, is formed with a plurality of depressions into which a luminous means respectively protrudes, and wherein said depressions with said luminous means are covered outwardly by the nontranslucent regions.

12. The emblem arrangement according to claim 7, further comprising an annular light attenuation element arranged between said light guide and a cover glass covering said layer structure.

13. A motor vehicle, comprising at least one emblem arrangement according to claim 7.

14. The emblem arrangement according to claim 7, wherein said layer structure is transmissive for radar beams.

15. The emblem arrangement according to claim 14, wherein said second nontranslucent layer is a semiconductor.

* * * * *